United States Patent
Dodrill et al.

(10) Patent No.: US 6,738,803 B1
(45) Date of Patent: May 18, 2004

(54) PROXY BROWSER PROVIDING VOICE ENABLED WEB APPLICATION AUDIO CONTROL FOR TELEPHONY DEVICES

(75) Inventors: Lewis Dean Dodrill, Richmond, VA (US); David William Geen, King George, VA (US); Satish Joshi, Glen Allen, VA (US); Ryan Alan Danner, Richmond, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/459,927

(22) Filed: Dec. 14, 1999

Related U.S. Application Data (60) Provisional application No. 60/152,316, filed on Sep. 3, 1999.

(51) Int. Cl.[7] .................. G06F 15/16; G06F 15/113; G06F 15/00
(52) U.S. Cl. .................. 709/218; 709/223; 709/227; 709/228; 715/500.1; 715/501.1; 715/513
(58) Field of Search .................. 709/228, 217, 709/218, 227, 229, 202, 231; 715/501.1, 513

(56) References Cited

U.S. PATENT DOCUMENTS

| | | | |
|---|---|---|---|
| 4,837,798 A | | 6/1989 | Cohen et al. |
| 5,802,314 A | * | 9/1998 | Tullis et al. ............... 709/246 |
| 5,884,262 A | * | 3/1999 | Wise et al. ............... 709/219 |
| 5,953,392 A | * | 9/1999 | Rhie et al. ............... 709/219 |
| 6,055,569 A | * | 4/2000 | O'Brien et al. ............... 709/203 |
| 6,233,318 B1 | * | 5/2001 | Picard et al. ............... 379/88.12 |
| 6,269,336 B1 | * | 7/2001 | Ladd et al. ............... 704/270 |
| 6,333,919 B2 | * | 12/2001 | Gaffney ............... 370/254 |
| 6,374,223 B1 | * | 4/2002 | Donaldson et al. ............... 704/260 |
| 6,404,859 B1 | * | 6/2002 | Hasan ............... 379/88.04 |
| 6,438,585 B2 | * | 8/2002 | Mousseau et al. ............... 709/206 |
| 6,459,774 B1 | * | 10/2002 | Ball et al. ............... 379/67.1 |

(List continued on next page.)

OTHER PUBLICATIONS

Flammia, Giovanni; "SMIL makes Web applications multimodal." IEEE Inellegent Systems, vol.: 13 Issue: 4 , Jul.–Aug. 1998 □□Page(s): 12–13.*
Aug. 17, 1999—VoiceXML Forum Version 0.9 Specification http://www.voicexml.org/specs/VoiceXML-0.9-19990817.pdf*
XML in 10 points, Mar. 27, 1999, 3 pages, BERT BOS.

*Primary Examiner*—Glenton B. Burgess
*Assistant Examiner*—Anita Choudhary
(74) *Attorney, Agent, or Firm*—Leon R. Turkevich (57) ABSTRACT

A unified web-based voice messaging system provides voice application control between a proxy browser having a web browser, and an application server via an hypertext transport protocol (HTTP) connection on an Internet Protocol (IP) network. The proxy browser serves as an HTTP interface for a user device that lacks HTML and HTTP processing capabilites, such as an analog telephone, a cellular telephone, a voice over IP telephone, and the like. The web browser receives an HTML page from the application server having an XML element that defines data for an audio operation to be performed by an executable audio resource within the proxy browser. The audio resource, also referred to as a media resource, selectively executes the HTML tags and the audio operation based on the determined capabilities of the user device. If the user device does not have audio capabilities, the media resource ignores the audio operation, and merely presents the HTML information, assuming the user device has a display. If the media resource determines that the user device has at least a speaker and possibly a microphone, the media resource executes the audio operation based on enhanced audio control specified by the XML element. Similarly, if the media resource determines that the user device does not have a display, the HTML tag information is discarded by the media resource. Hence, a proxy browser can be used by user devices to access enhanced voice control for voice enabled web applications.

64 Claims, 8 Drawing Sheets

U.S. PATENT DOCUMENTS 6,463,464 B1 * 10/2002 Lazaridis et al. ............ 709/207
6,466,971 B1 * 10/2002 Humpleman et al. ....... 709/220
6,477,529 B1 * 11/2002 Mousseau et al. ............. 707/5
6,501,832 B1 * 12/2002 Saylor et al. ............ 379/88.04
6,519,327 B1 * 2/2003 Cannon et al. .......... 379/88.22
2001/0012302 A1 * 8/2001 Gaffney ...................... 370/486

* cited by examiner

```
         <XML version = "1.0">
100 →  <PLUGIN_CONTROL>
      102 →    <PROMPTLIST type = "wav" prefetch = "true">
            104 →   <PROMPT> wav1.wav </PROMPT>
            106 →   <PROMPT> wav2.wav </PROMPT>
                </PROMPTLIST>
      110 →  <USERINPUT>
            112 →   <HOTKEY_PATTERN value = "(*[0-9])"/>
                    <MAXLENGTH> 10 </MAXLENGTH>
                </USERINPUT>
        </PLUGIN_CONTROL>
```
FIG. 5A

```
108 →   <PROMPT name = "wav1.wav" />
```
FIG. 5B

```
<HTML>
<HEAD>
<TITLE> Hello </TITLE>
<BODY>
        <FORM>
308 ──▶        (Form contents)
        </FORM>
300 ──▶ <EMBED file="http://server/wavdirectory/wavfile.wav"
                autostart = true>
302   <XML>
    304 ──<PROMPTLIST>
                <PROMPT type = "wav" name = "wavurl1"/>
                <PROMPT type = "wav" name = "wavurl2"/>
        </PROMPTLIST>
306 ──<RECORD upload = "upload URL"
                filename = "local filename to use"
                maxlength = "maximum record length"

/>
</XML>
</HTML>

</body>
</html>
```

PROXY BROWSER PROVIDING VOICE ENABLED WEB APPLICATION AUDIO CONTROL FOR TELEPHONY DEVICES

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to web browser control of audio operations for voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Figure 1:
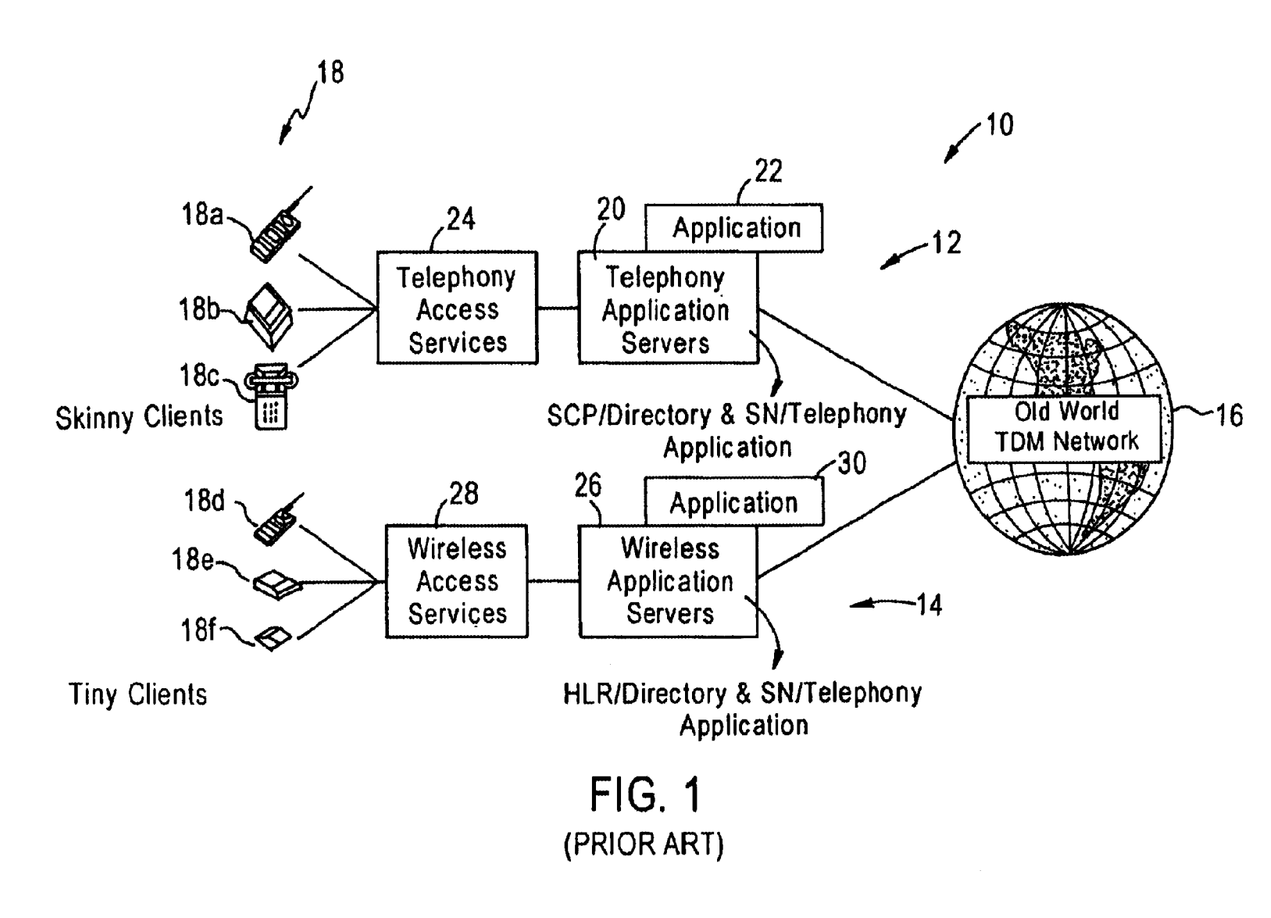
FIG. 1 is a block diagram illustrating an architecture paradigm of the existing public switched telephone network.

FIG. 1 is a diagram illustrating the existing public switched telephone network. As shown in FIG. 1, the public switched telephone network 10 includes a wireline subnetwork 12, a wireless subnetwork 14, and a time division multiplexed (TDM) backbone subnetwork 16 configured for transporting voice data and other data between user devices 18 according to the existing public switched telephone network protocols. The subnetwork 16, for example, includes interexchange trunks for transporting voice data between interexchange carriers and/or local exchange carriers.

As shown in FIG. 1, the wireline subnetwork 12 includes telephony application servers 20 configured for providing voice applications 22 such as subscriber profile management, voice mail, call forwarding, etc. for the user devices 18a, 18b, and 18c coupled to the wireline subnetwork 12. As recognized in the art, the telephony application servers 20 include advanced intelligent network (AIN) components such as services control point (SCP) directories and service nodes (SN) configured for controlling the telephony applications 22. The wireline subnetwork 12 also includes telephony access services 24 configured for providing the user devices 18a, 18b, and 18c access to the wireline subnetwork using, for example, analog twisted pair connections or ISDN connections to a central office. The user devices 18a, 18b, and 18c, illustrated as a cordless telephone 18a, a fax machine 18b having a connected telephone, and an analog telephone 18c, are referred to herein as "skinny clients", defined as devices that are able to interface with a user to provide voice and/or data services (e.g., via a modem) but cannot perform any control of the application 22 or the protocol used to interface with the wireline subnetwork 12.

The wireless subnetwork includes wireless application servers 26, and wireless access services 28 for providing wireless voice and data services to the wireless user devices 18d, 18e, and 18f. The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, interact with the wireless application 30 based on respective wireless protocols controlled by the wireless access services 28. The wireless application servers 26 control wireless services such as home location register (HLR) management, and service node (SN) telephony applications. "Tiny clients" are distinguishable from skinny clients in that the tiny clients tend to have even less functionality in providing input and output interaction with a user, and may not be able to send or receive audio signals such as voice signals at all. Examples of tiny clients include wireless user devices 18d, 18e, and 18f, as well as function-specific terminal devices. Note that tiny clients tend to be one-way (receive-only or transmit-only) devices.

In both cases, however, both skinny clients and tiny clients have no control of the respective applications 22 and 30 that are running within the respective networks. Rather, the applications 22 and 30 are executed exclusively by the servers 20 and 26. Moreover, both skinny clients and tiny clients have no control of the access protocol used to access the respective subnetworks 12 and 14; hence, the skinny clients and tiny clients are currently incapable of initiating access to another network using an alternative protocol, for example Internet protocol (IP). Consequently, the skinny clients and tiny clients rely exclusively on the service nodes of the servers 20 and 26 to provide the voice application services programmed in the applications 22 and 30, respectively. Although this exclusive control of the applications 22 and 30 by the servers 20 and 26 is advantageous in maintaining control over quality of service and reliability requirements, the applications 22 and 30 can only be developed and maintained by programmers having sufficient know-how of the public switched telephone network infrastructure. As a result, programmers familiar with open standards such as IP are unable to provide contributions in enhancing the applications 22 and 30 due to the limitations of the public switched telephone network paradigm.

Figure 2:
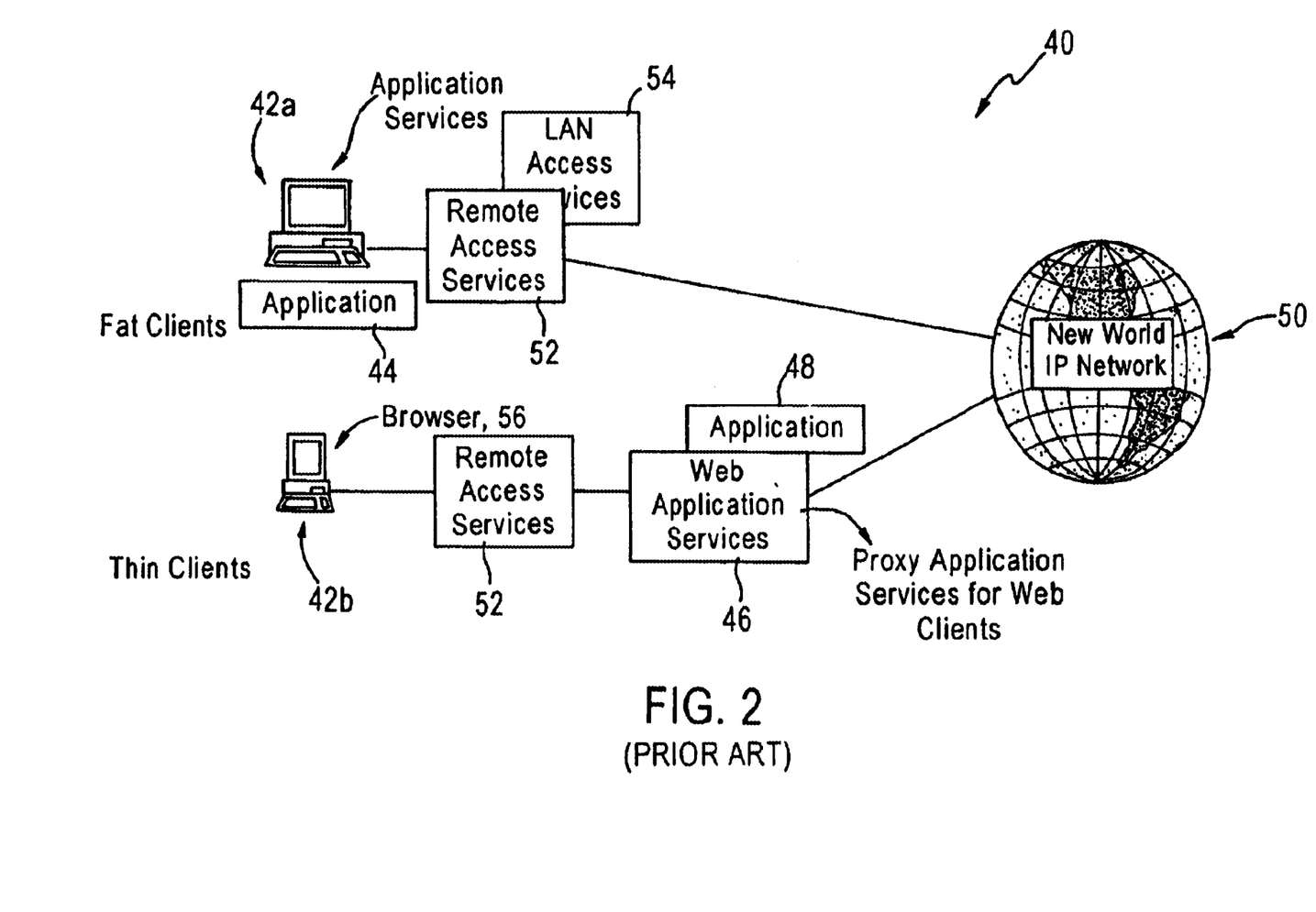
FIG. 2 is a block diagram illustrating an architecture of the existing web client-server paradigm of an Internet protocol (IP) network.

FIG. 2 is a diagram illustrating the web client-server paradigm of an open standards-based IP network 40, such as the World Wide Web, the Internet, or a corporate intranet. The IP network 40 provides client-server type application services for clients 42a and 42b by enabling the clients 42 to request application services from remote servers using standardized protocols, for example hypertext transport protocol (HTTP). For example, the client 42a is a stand-alone personal computer or workstation that has its own application 44 for providing its own application services. The client 42a can access a remote web application server 46 that executes a different set of application services 48 via an IP-based packet switched network 50 using either remote access services 52 or local area network access services 54, if available. Similarly, the client 42b having only a browser 56 can also enjoy the services of the applications 44 and 48 by accessing the respective computers 42a and 46.

The clients 42a and 42b, referred to herein as "fat clients" and "thin clients", respectively, have the distinct advantage that they can initiate requests using IP protocol to any connected web server 46 to execute part or most of the applications 48 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

Hence, the web server paradigm enables the clients 42 to access any web server on the IP network 40. Moreover, the use of open protocols such as HTTP and HTML enable any client 42, regardless of its configuration, to access an HTML web page from a server that has no knowledge of the configuration of the requesting client; if the HTML web page received by the client includes information such as a specific HTML tag that is not recognizable by the browser 56, the browser 56 can merely ignore the unrecognized HTML tag.

Efforts at extending the voice applications 22 and 30 from the public switched telephone network to the IP network 40 have had limited success, primarily because the telephone protocols used in development of the applications 22 and 30 do not operate under the same paradigm as the IP network 40. For example, the telephony applications 22 and 30 are state aware, ensuring that prescribed operations between the application servers 20 or 26 and the user devices 18 occur in a prescribed sequence. For example, operations such as call processing operations, voicemail operations, call forwarding, etc., require that specific actions occur in a specific sequence to enable the multiple components of the public switched telephone network to complete the prescribed operations.

The applications 44 and 48 running in the IP network 40, however, are state-less: the applications 44 and 48, in response to reception of a specific request in the form of a URL from a client 42, instantiate a program configured for execution of the specific request, send an HTML web page back to the client 42, and end the program that executed the specific request. Although state information may be passed between the browser 56 and a web application 48 using a data file referred to as a "cookie", some users prefer not to enable cookies on their browser 56; in addition, the passing of a large amount of state information as would normally be required for voice-type applications between the browser 56 and the web application 48 would substantially reduce the bandwidth available for the client 42.

In addition, HTML does not provide the type of control that is necessary to support voice applications. Specifically, HTML was designed as a set of specifications for embedding instructions within text that specifies to a browser how the text should be presented to the user. Hence, HTML is particularly effective for presenting on a browser a web page having text and image data, or forms data. However, HTML does not provide good media control: if instructions are embedded within an HTML page, there is no guarantee that a browser will execute the embedded instructions as intended by the web page designer.

Hence, efforts have been made to integrate the telephony applications 22 and 30 directly onto the IP network 40 by developing protocol translators that provide a termination between the telephony applications servers 20 and 26 and the web application servers 46. One such proposal is referred to as voice over IP, where telephony data from the telephony applications 22 and 30 are repackaged into IP packets for transmission across the IP network 50. These efforts, however, still require programmers who have substantial know-how of the telephony applications 22 and 30 and the public switched telephone network infrastructure. Moreover, the repackaging of telephony data into IP packets creates substantial problems in transmission of the telephony data, since the transport of IP data packets is not sequential and synchronous, as required for the voice applications.

Another attempt at performing voice applications over an IP network involves rewriting the telephony applications 22 and 30 as scripts in extensible markup language (XML), and sending the XML scripts over the IP network to an interpreter that is coupled to a telephone. The interpreter then plays the received XML scripts for the telephone. However this approach merely transfers some application functionality from the telephony applications 22 and 30 to the interpreter, and still requires telephony application engineers to write XML scripts of the applications 22 and 30. Hence, the IP network is used only for transporting the XML scripts, and does not take advantage of the open standards-based flexibility of the IP network that has provided enormous growth in web infrastructure and Internet commerce.

An additional concern in attempting voice applications over an IP network involves providing backwards compatibility for the existing devices 18 configured for communication via the public switched telephone network 10. Unlike the clients 42 in FIG. 2, the skinny clients 18a, 18b, and 18c and the tiny clients 18d, 18e, and 18f cannot perform any application control functions. Hence, any proposed system that extends the voice applications 22 and 30 to the IP network 40 will have limited success in the marketplace unless the skinny clients and the tiny clients are able to enjoy the same type of services as the clients 42.

SUMMARY OF THE INVENTION

There is a need for an arrangement that enables voice applications to be implemented on an IP packet switched network using the open standards-based flexibility of the IP network.

There is also a need for an arrangement that enables voice applications to be implemented using HTTP and HTML open standards, enabling development of voice applications by individuals that do not have expertise in the public switched telephone network. For example, there is a need for arrangement that enables voice applications to be designed by web programmers.

There is also a need for an arrangement that enables voice applications to be implemented using an IP network, without the necessity of the public switched telephone network.

There is also a need for an arrangement that enables unified voice messaging services to be provided via an IP network to any device having a browser, regardless of the configuration of that browser.

There is also a need for an arrangement that enables a web browser to provide advanced audio control features to enable voice enabled web applications from a web server to be presented to a user of the web browser.

There is also a need for an arrangement that enables user devices that lack application control functionality to enjoy voice application services using an IP network, without substantial modification to the user devices.

These and other needs are attained by the present invention, where a web browser receives an HTML page having an XML element that defines data for an audio operation to be performed by an executable audio resource. The web browser selectively executes the audio operation based on whether the web browser detects the presence of the executable audio resource. If the web browser does not have the executable audio resource, then the web browser ignores the XML element, and merely presents any other recognized HTML tags. However if the web browser has access to an executable audio resource that understands the XML element, then the web browser executes the audio operation based on enhanced audio control specified by the XML element. Hence, a web browser can be used to provide enhanced voice control for voice enabled web applications, merely by possession of an executable audio resource that recognizes the XML element that specifies the enhanced audio control required for the audio operation to be performed.

In addition, the web browser provides voice services for user devices that lack application control functionality by acting as a proxy browser for the user devices. In particular, the proxy browser is executable within an interface between a public switched telephone network component and the IP network. The proxy web browser, based on capabilities information for a corresponding user device, is configured for selectively ignoring received HTML tags that specify media content to be displayed, and selectively executing the audio operations specified by the XML element. Hence, the proxy browser supplies to a user device only the content that the user device is capable of interpreting, for example audio signals for an analog telephone, or text for a pager or a facsimile machine.

According to one aspect of the present invention, a method is provided in a proxy browser for executing a web browser according to hypertext transport (HTTP) protocol. The method includes receiving a hypertext markup language (HTML) page by the web browser, from an HTTP connection, having an HTML tag and at least one extensible markup language (XML) element defining data for an audio operation to be performed by an executable media resource, determining capabilities of a user device configured for receiving prescribed media information from the device, and selectively executing by the executable media resource at least one of the HTML tag and the audio operation for delivery of the prescribed media information to the user device, based on the determined capabilities of the user device. The reception of an HTTP page that includes XML element defining data for an audio operation to be performed enables the web browser to receive advanced audio control functions from a web server via an HTTP connection, without any modification to the web browser. Moreover, the selective execution of the HTML tag and the audio operation based on determined capabilities of the user device ensures that user devices receive as much media content as the devices are configured to receive; hence, if a user device does not have a certain capability, the corresponding operation is disregarded, ensuring that the user device has access to the media services without suffering from incompatability problems. Another aspect of the present invention provides a processor-based device configured for executing audio operations based on a hypertext markup language (HTML) page received from a server according to hypertext transport protocol (HTTP). The device includes a web browser configured for selectively interpreting the HTML page, the HTML page including at least one of an HTML tag and an XML element that defines data for an audio operation to be performed for a user device. The device also includes a media resource configured for selectively executing at least one of the audio operation and the HTML tag based on determined capabilities of the user device. The web browser provides an HTTP connection for the user device, enabling the user device to access application services that previously were not available to the user device, including web-based audio services such as voice messaging. Moreover, the media resource ensures that the user device does not receive information from the HTML page that the user device cannot process, ensuring that any user device can access an HTTP connection, regardless of its corresponding capabilities.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to an arrangement for providing unified voice messaging services and data services via an IP network using a web browser having audio control for voice enabled web applications. The ability to provide unified voice messaging services via an IP network enables existing web servers on the World Wide Web or in corporate intranets to support telephone applications on a scalable and economic platform. Moreover, providing unified voice messaging services via an IP network enables use of open standards that permits web programmers to use existing web programming techniques to design and implement voice telephone applications for use by any client device, regardless of its capabilities. A description will first be provided of the web-based voice enabled web applications using XML audio control within a generic web browser, followed by a description of implementation of the browser as a proxy browser for client devices having limited control capabilities.

Figure 3:
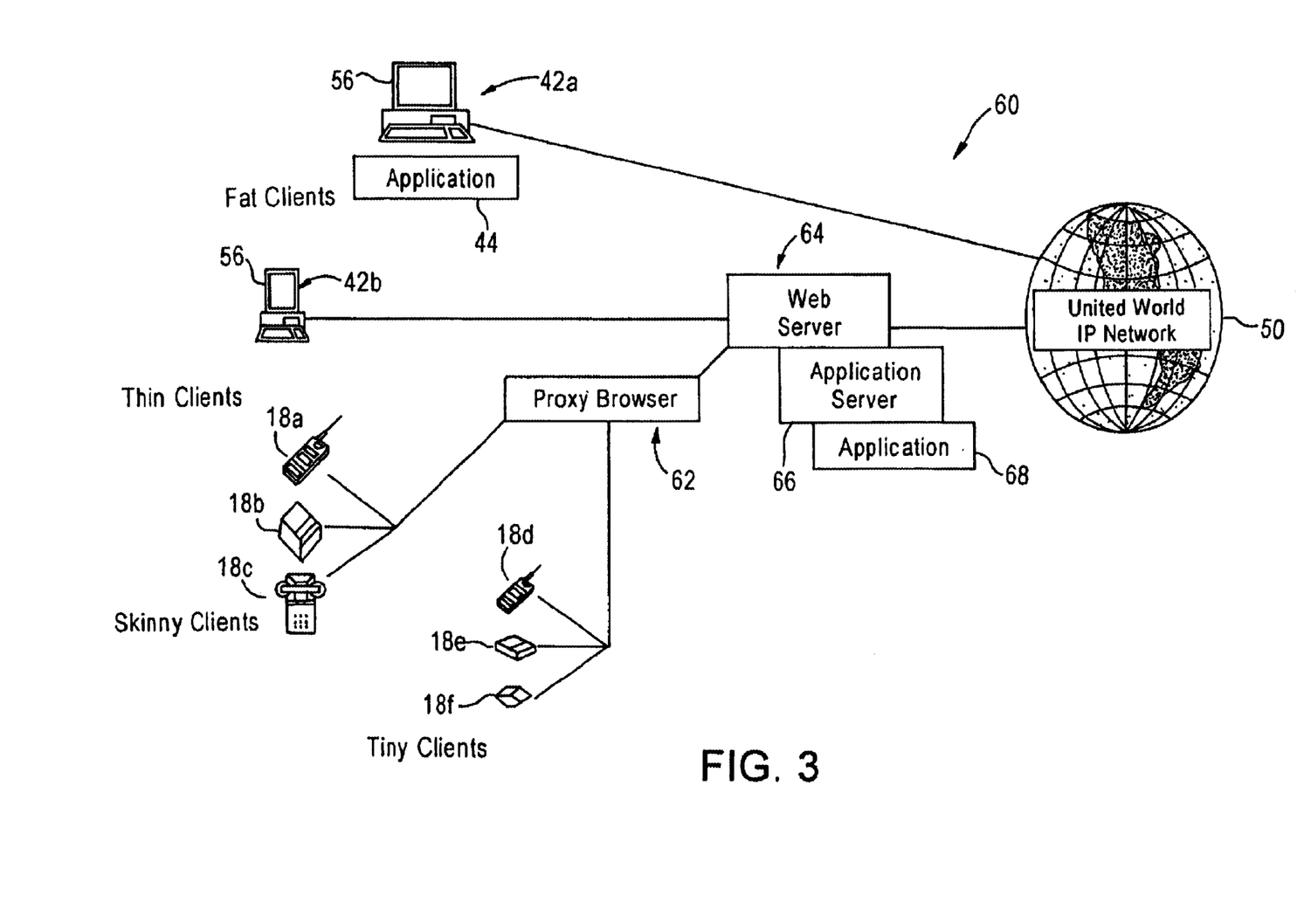
FIG. 3 is a block diagram illustrating a novel paradigm that enables unified voice messaging services and data services to be provided via an IP network using browser audio control according to an embodiment of the present invention.

FIG. 3 is a block diagram illustrating an architecture that provides unified voice messaging services and data services via an IP network using browser audio control according to an embodiment of the present invention. As shown in FIG. 3, each of the clients (tiny clients, skinny clients, thin clients and fat clients) are able to communicate via a single, unified architecture 60 that enables voice communications services between different clients, regardless of whether the client actually has browser capabilities. For example, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The skinny clients 18a, 18b, and 18c and the tiny clients 18d, 18e, and 18f also have access to the unified voice messaging services in the unified network 60 by accessing a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a, the fax machine 18b (having a telephone), and the telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60. The proxy browser 62 may also interface with other tiny clients such as function-specific terminal devices having limited support by providing a simple set of commands supported by the function-specific terminal devices.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 may be similar to the web application server 46 of FIG. 2 by providing proxy application services for web clients. However, the web server 64 preferably serves as an interface between the browsers and an application server 66 that provides an executable runtime environment for XML voice applications 68. For example, the web server 64 may access the application server 66 across a common Gateway Interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing. In particular, the application server 66 may either access static XML pages, or the application server 66 may access stored XML application pages (i.e., pages that define an application) and in response generate new XML pages during runtime and supply the generated XML pages to the web server 64. Since multiple transactions may need to occur between the browser 56 or 62 and the application server 66, the application server 66 may store for each existing session a data record, referred to as a "brownie", that identifies the state of the existing session; hence, the application server 66 can instantiate a procedure, return the necessary data, and terminate the procedure without the necessity of maintaining the instance running throughout the entire user session.

Figure 4:
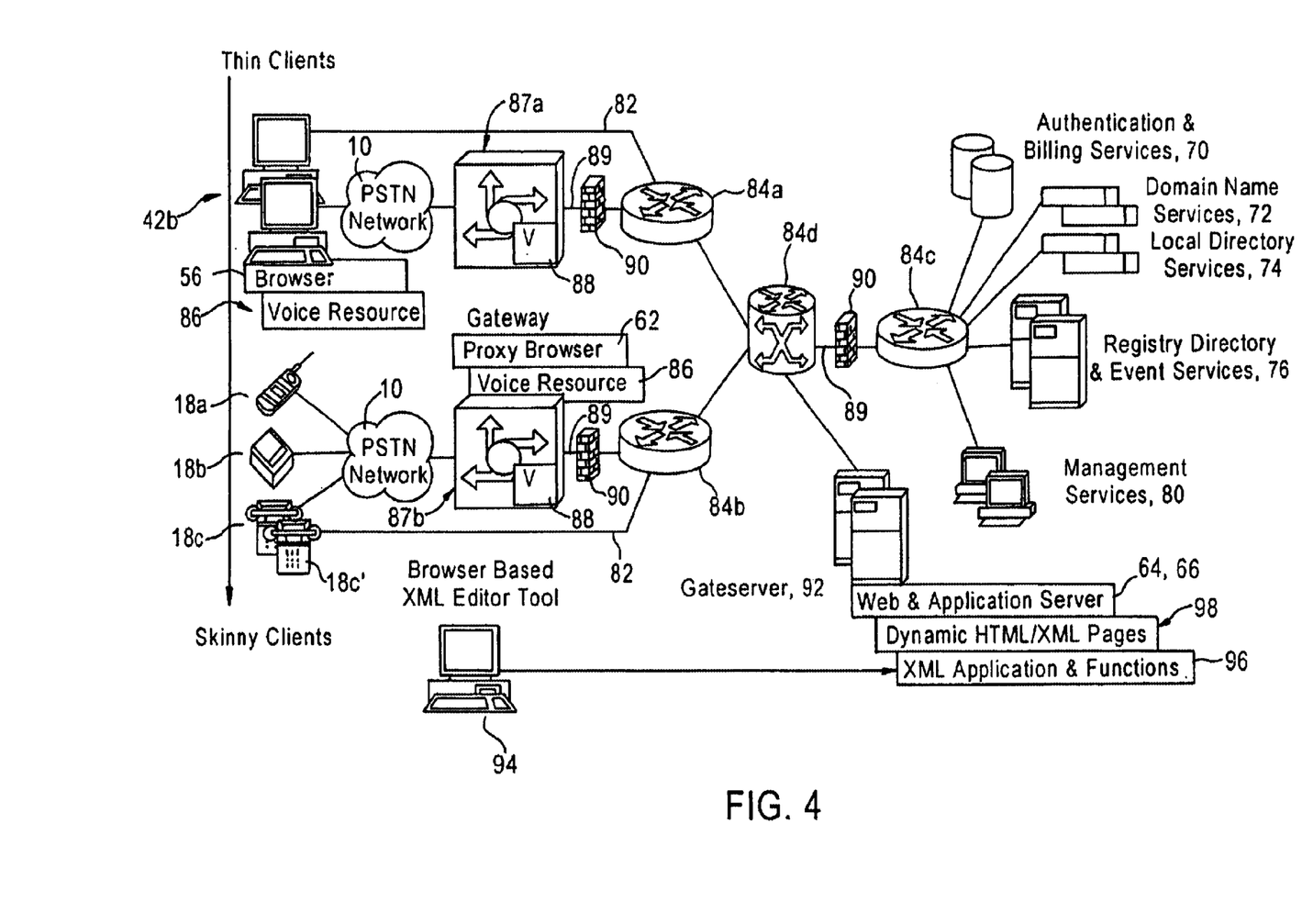
FIG. 4 is a diagram illustrating in further detail implementation of voice applications on the IP network of FIG. 3 according to an embodiment of the present invention.

FIG. 4 is a diagram that illustrates in further detail the network 60 of FIG. 3. As shown in FIG. 4, the arrangement of providing browser audio control for voice enabled web applications enables voice application services to be implemented in a web server paradigm for many different telephony services, including authentication and billing services 70, domain name services 72, local directory services 74, registry directory and event services 76, and management services 78.

FIG. 4 also illustrates in further detail the browser and web application server interaction. In particular, the thin clients 42b (and fat clients 42a) may be configured for accessing the web server 64 via a direct IP connection 82 to a router 84. The thin client 42b can directly access the web server 64 for voice enabled web application services if the thin client 42b has a browser 56 and an executable voice resource 86, for example an executable XML aware plug-in resource , described below, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' would process only audio functions, and would ignore any tags associated with text or image content. The proxy browser 62 is described below in further detail with reference to FIGS. 6 and 7.

As shown in FIG. 4, the web server 64, the application server 66, and the voice web applications 68 reside within a gateserver 92. The gateserver 92 includes a browser based XML editor tool 94 that enables a web programmer to design voice applications using XML pages, described below. The XML pages are stored as XML applications and functions 96, for example within a database accessible by the application server 66. The XML pages stored within the XML application and functions 96 may be stored as static pages to be fetched by the web server 64 and supplied to a browser, however the XML pages may also define the actual application to be executed by the application server 66 in runtime. Hence, the application server 66 may execute stored XML applications and functions 96, and in response generate dynamic HTML having XML tags, also referred to as HTML/XML pages.

According to the disclosed embodiment, the browsers 56 and 62 provide audio control for voice enabled web applications based on the HTML-XML pages supplied by the application server 66 to the web server 64 for transport across an HTTP connection. The browsers 56 and 62, as well as the voice resources 86, can be implemented as computer code that is stored on a computer readable medium (e.g., a hard disk drive, a floppy drive, a random access memory, a read only memory, an EPROM, a compact disk, etc). The following description elaborates on the combination of XML tags within HTML pages, enabling the voice resources 86 to provide browser audio control for voice enabled web applications.

Figure 5A:
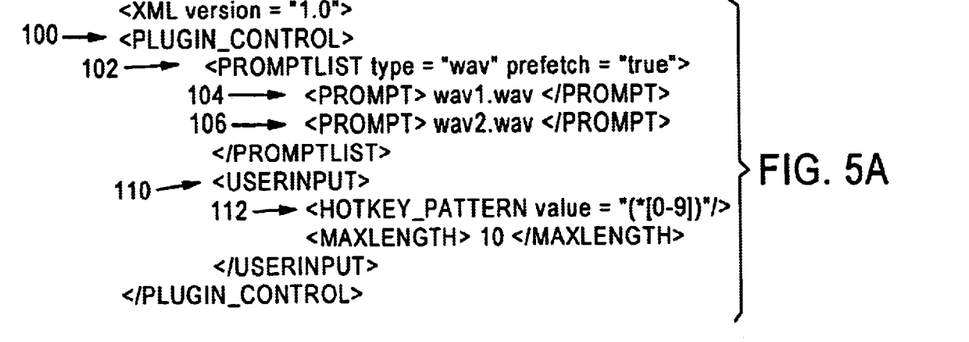
FIGS. 5A and 5B are diagrams illustrating extensible markup language (XML) expressions usable for implementation of voice applications on the IP network.
Figure 5B:
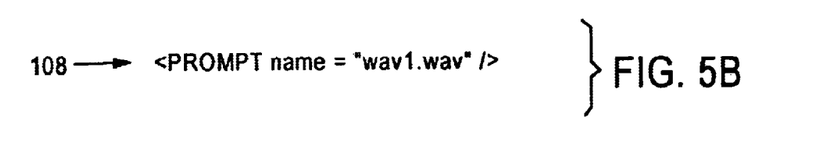

FIGS. 5A and 5B are diagrams illustrating XML expressions usable for browser audio control. In contrast to HTML, XML does not define output, but rather XML defines data. Hence, XML enables a browser 56 or 62 to exchange data with a voice resource 86 such as a plug-in resource or a Java applet, or an application server 66 via a CGI. Hence, use of XML provides precise control between the voice resource 86 and the application server 66, across an HTTP connection, using a structured and open protocol as opposed to a closed, proprietary protocol. Hence, different voice applications can be developed and shared between multiple programmers based on the open architecture of XML, resulting in new opportunities for web programmers to develop and improve voice applications in a web based paradigm.

As shown in FIG. 5A, a set of XML tags may be generated, by the application server 66, that provide a set of controls for a plug-in resource. For example, the XML tag 100 specifies plug-in control elements to be used for controlling an XML aware plug-in resource. The plug-in control elements include a prompt list 102 that includes an attribute (prefetch) that instructs the plug-in resource 86 to automatically fetch the prompts 104 and 106, identified as audio files "wav1.wav" and "wav2.wav", from the application server 66 and play them sequentially as prompts. Note that conventional HTML web browsers could not execute more than one audio file at a time, since the browser would not know whether to play all the audio files simultaneously, or interrupt the playing of one audio file with another audio file, or play only one of the audio files. The extensible nature of XML elements, however, enables attributes to be defined for each XML element; hence, the XML aware plug-in resource 86 knows that it needs to prefetch all the .wav files specified in XML tags 104 and 106, and play them in sequence.

FIG. 5B illustrates an alternative format for specifying the prompts 104 and 106. In particular, the XML tag 108 is encased within tags, enabling a standard browser 56 that does not understand the prompt tag to easily discard/ignore the XML tag 108. Hence, the structure of FIG. 5A use more adapted for XML parsing, however an HTML browser that does not have an XML aware plug-in resource may misinterpret one of the prompts 104 or 106, and erroneously parse one of the prompts 104 or 106 as data to be displayed. Hence, the structure of FIG. 5B is preferable to insure that an HTML browser does not misinterpret an XML expression.

FIG. 5A and also illustrates an XML element 110 that defines hotkey pattern values in XML tag 112 that enables the XML aware plug-in resource 86 to initiate execution of a prescribed audio operation in response to detecting a single key input (e.g., *5) by immediately posting the single key input to the server and receiving another XML page that includes the prescribed audio operation, in contrast to HTML form tags, which cannot automatically submit data to a web server upon receipt of a digit. Hence, the ability to define hotkey pattern values enables a web application developer to use XML to define applications that perform voice mail type operations, such as responding to hotkey inputs. As described below, the appearance of hotkey pattern values is implemented merely by posting the input upon receipt thereof, and receiving another XML page.

As described above, the browsers 56 and 62 enable a user's device to be isolated from the web server application side (64, 66) of the network. Hence, user devices (e.g., 18a, 18b, 18c, 42) interacting with the respective browsers 56 or 62 may have completely different hardware or software configurations, as well as different operating environments. In addition, the browser strategy of tagging is flexible, since one user device may not have a microphone, another user device may not have speakers, and another device may not have an alphanumeric or graphical display. According to the disclosed embodiment, the proxy browser 62 is configured for selectively executing the HTML tags and the XML tags based on capabilities data stored for the corresponding client device. In particular, the proxy browser 62 stores for each corresponding user device capabilities data that specifies functions that the user device is able to perform. For example, the capabilities data will specify for each user device whether the user device includes a display for alphanumeric or graphical images, whether the user device includes a sound processor for playing digital audio files via a speaker and recording digital audio files using a microphone, whether the user device has a microphone and speaker for reception and playback of analog audio signals, or whether the user device has a numeric keypad (digital or DTMF) or any key for accepting user inputs.

Figure 6:
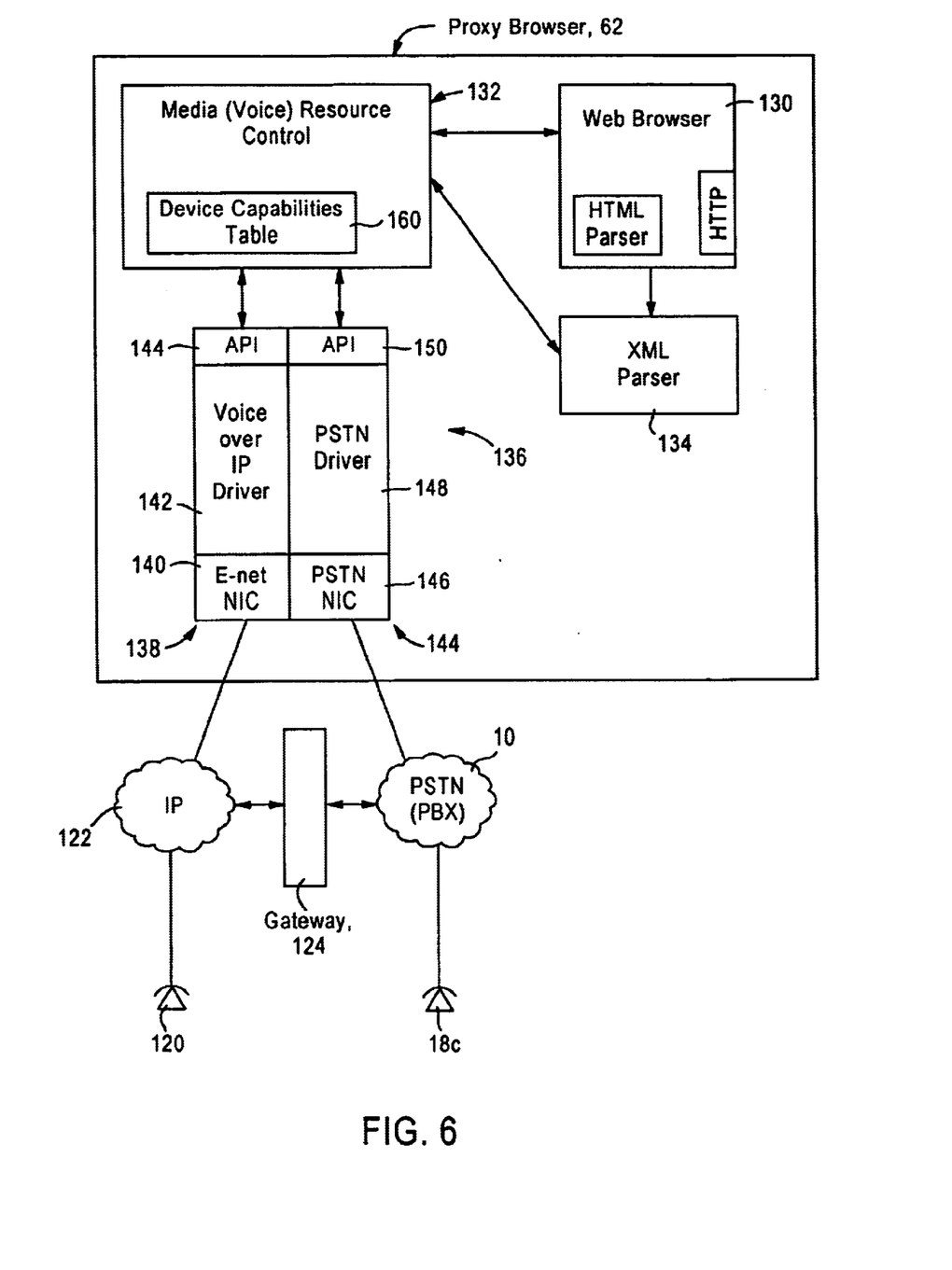
FIG. 6 is a diagram illustrating in further detail the proxy browser of FIG. 4.

FIG. 6 is a diagram illustrating in detail the proxy browser 62 configured for providing web application audio control for user devices according to an embodiment of the present invention. In particular, the proxy browser 62 is configured for providing audio control for devices such as an analog telephone 18c via the PSTN 10, or an Internet protocol telephone 120 having an IP connection via an IP-based packet switched network 122, or any of the skinny or tiny client devices as illustrated in FIG. 2. As shown in FIG. 6, the analog telephone 18c may also be connected to the IP network 122 via a voice over IP gateway 124.

The proxy browser 62 includes an HTTP-compliant browser 130, a voice resource control 132 similar to the voice resource 86 of FIG. 4, an XML parser 134, and a device interface 136.

The device interface 136 provides a connection for the proxy browser 62 with the user device, for example the telephone 18c or the IP telephone 120, via the corresponding user device access network or 122. In particular, the device interface 136 includes network specific hardware interface cards and associated drivers that enable the voice resource control 132 to send voice audio commands to the device interface 136; the device 136 then implements those audio commands according to the specific protocols of the network coupling the user device to the proxy browser 62.

For example, the device interface 136 includes an IP network interface card 138 that includes an Ethernet (IEEE 802.3) network interface card 140, and voice over IP control software 142 that is compliant, for example, with Recommendation H.323 from the Telecommunication Sector of the International Telecommunication Union (ITU-T)). The control software 142 serves as the driver software for the Ethernet card 140. The voice over IP control software 142 may include a set of application programming interfaces 144 that enable the voice resource control 132 to issue function calls to the voice over IP control software 142; alternatively, the voice resource control 132 may issue function calls directly to the voice over IP software 142, bypassing the API routines 144. Exemplary H.323 compliant IP network interface cards 138 are available from Intel, Inc. or RADVision, Inc, Mahwah, N.J.

The device interface 136 also includes a PSTN network interface card 144 configured for sending and receiving audio signals such as voice signals in response to voice audio commands from the voice resource control 132. The PSTN network interface card 144 includes a hardware network interface card 146, and associated driver software 148 for controlling the network interface card 146. As described above, the driver software 148 may include a set of APIs 150 that enable the voice resource 132 to issue function calls to the driver software 148; alternatively, the voice resource control 132 may issue function calls directly to the driver software 148. An exemplary network interface card 144 is available from Dialogic, Inc., Parsippany, N.J.

Hence, the IP network interface card 138 and the PSTN network interface card 144 each are able to perform basic telephony type functions, such as detect an on hook or off-hook condition by the corresponding user device (e.g., IP phone 120 or analog telephone 18c), detect an incoming phone call or message under the control of the voice resource control 132 and notify the corresponding user device accordingly (e.g., by ringing the device or flashing an alert message, etc.), and send and receive audio signals between the user device and the voice resource controller 132.

The browser 130 is configured for sending and receiving HTTP pages to and from the application server 66 according to HTTP protocol. In addition, the browser 130 communicates with the XML parser 134, which is configured for parsing the XML tags within the received web page. The XML parser 134 forwards the XML tags recovered from the received web page to the voice resource control 132. If desired, the voice resource control 132 may be implemented to include the XML parser 134.

The voice resource control 132, also referred to as a media resouce, is configured for selectively implementing the HTML and/or XML tags from the browser 130 and the XML parser 134, respectively, based on the capabilities of the user device that is to receive the information in the HTML and/or XML tags. In particular, the voice resource control 132 includes a device capabilities table 160 configured for storing the capabilities of the corresponding user device. For example, the device capabilities table 160 includes for each user device a unique device identifier, a network address (e.g., a 10 digit telephone number or an IP address), and an identification of the capabilities of the user device. For example, the device capabilities table 160 specifies whether the user device accepts only text data, such as a pager device, and whether the user device is able to respond to a single prompt or multiple prompts. Alternately, the device capabilities table 160 may specify whether the user device accepts only analog audio data (e.g., an analog speaker), or whether the user device includes an audio processor configured for playing digital audio data. The device capabilities table 160 also specifies whether the user device has a microphone for generating analog audio signals, and whether the user device has been analog to digital converter for converting the analog audio signals to digital audio data.

Hence, the voice resource control 132, upon determining the capabilities of a corresponding user device, selectively implements HTML tags and/or XML tags by outputting the appropriate commands to the device interface 136. Hence, any user device can be served by the proxy browser 62, regardless of the capabilities of the user device, since the proxy browser 62 provides to the user device only the information that the corresponding user device can process.

Figure 7:
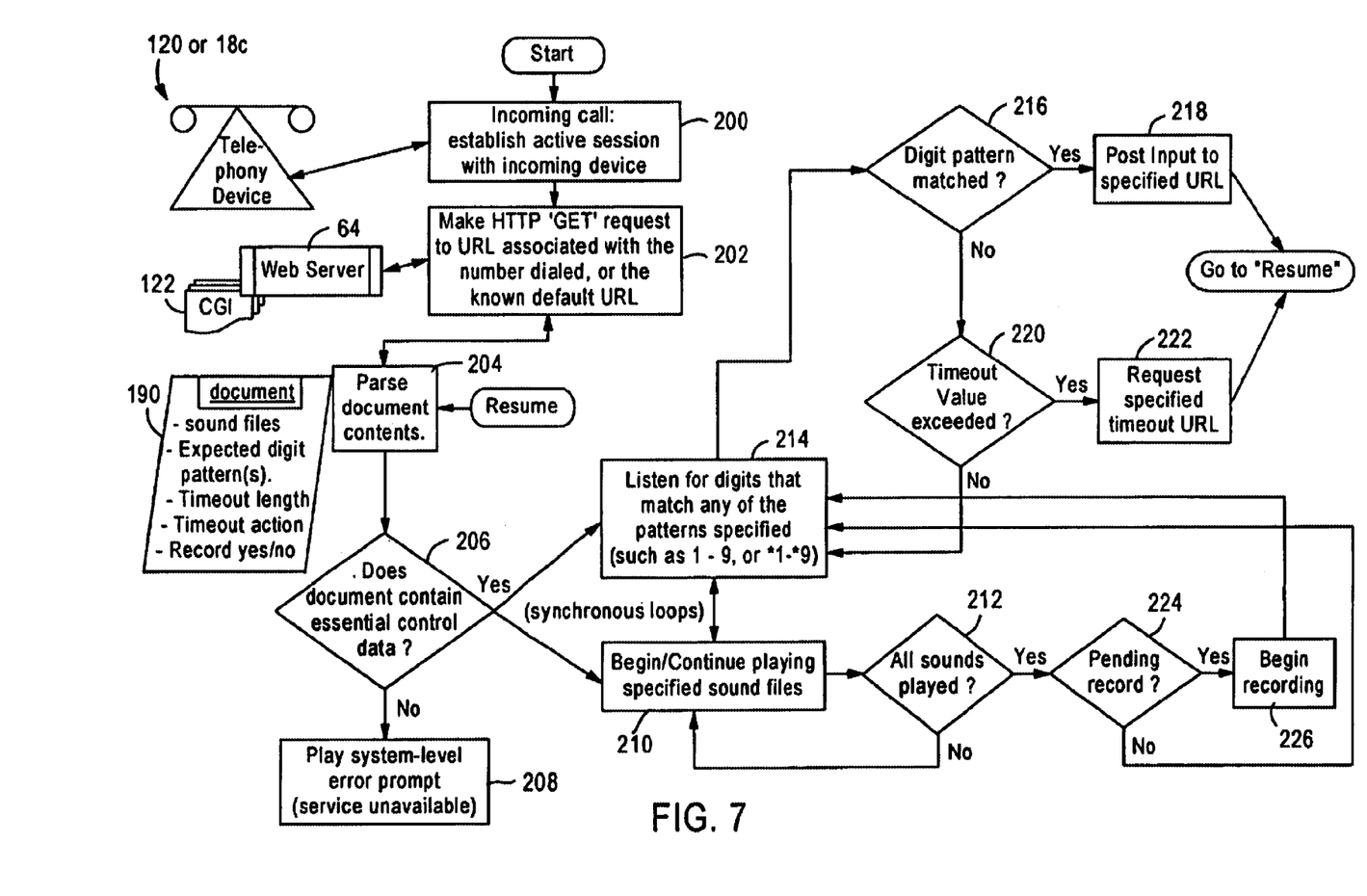
FIG. 7 is a flow diagram illustrating a method of providing proxy browser audio control for voice enabled web applications according to an embodiment of the present invention.

FIG. 7 is a diagram illustrating a method of providing browser audio control for voice enabled web applications using a proxy browser according to an embodiment of the present invention. The method begins in step 200, where the proxy browser 62 detects an incoming call from a user device, for example the IP telephone 120 or the analog telephone 18c. In particular, the device interface 136 detects the off hook condition by the user device 120 or 18c, and sends a notification to the voice resource controller 132, including the number dialed by the user. The voice resource controller 132 identifies the calling user device, determines the device capabilities from the stored capabilities table 160, and requests a session from the browser 130. The browser 130, operating in run-time for servicing a plurality of user devices, initiates an active session with the incoming user device, and generates an HTTP "POST/GET" request in step 202 for posting to a uniform resource locator (URL) associated with the number dialed (e.g., "http://appserver.net/7035551212"), else to a default URL. The web server 64, in response to receiving the request, forwards the request to the application server 66 across a common gateway interface (CGI) 122. The application server 66 returns the requested page 190, and the web server 64 forwards the generated page 190 including HTML and XML tags to the proxy browser 62 across an HTTP link, enabling the proxy browser 62 to parse the web page 190 in step 204.

Figure 8:
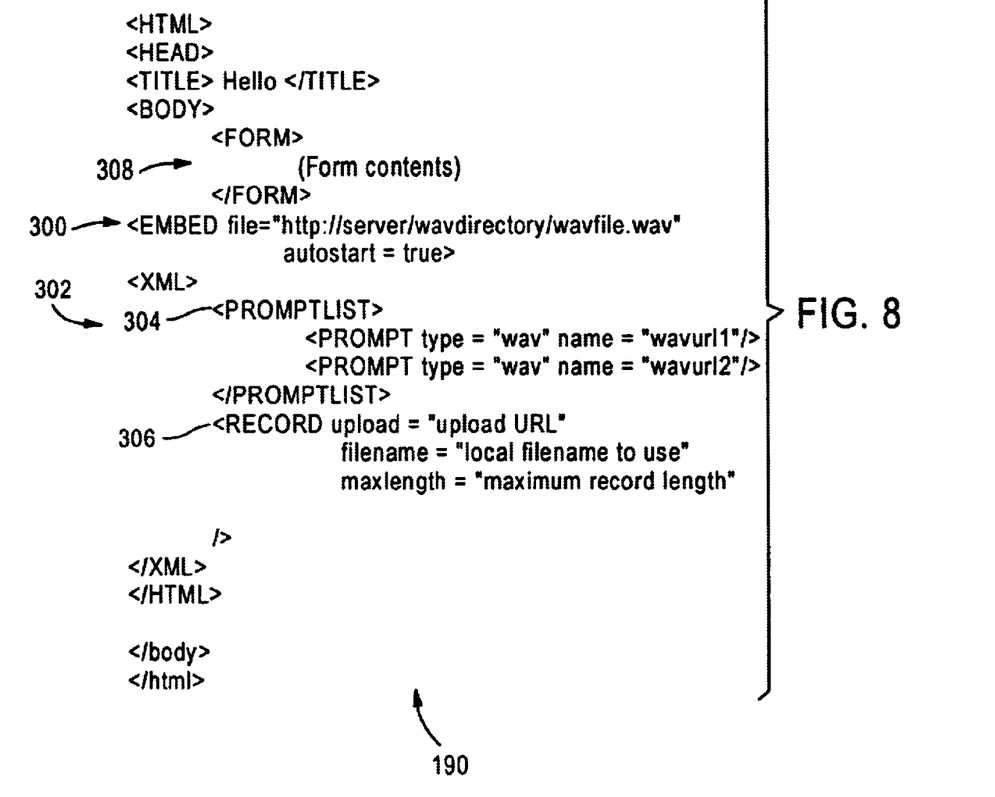
FIG. 8 is a diagram illustrating in detail the web page received by the proxy browser in the method of FIG. 7.

FIG. 8 is a diagram illustrating the web page 190 received by the proxy browser in step 204. The web page 190 will typically include sound files, expected digit patterns, timeout length, timeout action, and an indication whether a record operation is required. The XML tags within the web page 190 typically include XML directives that specify, for example, prompts to play, input patterns to match (e.g., (0–9, *0–*9, #, etc.), and optionally timeout parameters and record control. As shown in FIG. 8, the web page 190 may include a standard embed tag 300 in HTML format, and an in line XML portion 302 that includes media control information, such as a prompt list 304 and control information 306 for a record operation to be performed by the XML aware voice resource 132.

The browser 130 parses the HTML contents and the XML parser 134 parses the XML tags in step 204. The browser passes all HTML tags to the voice resource 132 and the XML parser 134 passes all XML data to the voice resource 132. The voice resource 132 then checks in step 206 whether the XML data includes control data that is essential for the voice resource 132 to provide voice application control to the user device 120 or 18c. If the voice resource 132 determines in step 206 that the web page 190 does not include essential control data from the application server 68, then the voice resource control 132 plays a stored system level prompt in step 208 indicating that service is unavailable.

If the voice resource 132 determines in step 206 that the web page 190 includes the essential control data, then the voice resource 132 begins to play in step 210 sound files (e.g., the audio file "wavfile.wav") fetched by the browser 130 from the web server 64, for example as a welcome greeting. Hence, the audio resource 132 plays the audio files "wavurl1" and "wavurl2" in the prescribed sequence while waiting for a user input in steps 212 and 214: if there is-no user input, the audio resource continues to play the audio files in steps 210 and 212. For example, the audio resource 132 (e.g., the plug-in resource or the Java applet) plays a "Good Morning" prompt for wavurl1 and "Enter Your Phone Number followed by the Pound (#) Key" prompt for wavurl2, while waiting for an input pattern ([0–9] {7,9}#). This exemplary pattern ([0–9] {7,9}#) specifies to the XML aware audio resource 132 that a valid input is composed of any string of the characters 0 through 9 for a length of 7 to 9 digits, followed by a pound key. The XML aware audio resource 132 continues to play the audio files in the pre-scribed sequence while waiting for the user to input a key entry. If the voice resource controller 132 detects a user input from the user device during playing of the audio files, the voice resource controller 132 interrupts the playing of the audio files.

In response to receiving input digits from the user device, the voice resource controller 132 determines in step 216 if the user input matches the input pattern; if the digit pattern is matched, the voice resource controller 132 causes the browser 130 to post the data in step 218 to the voice application URL. If in step 216 the input digits do not match the prescribed digit pattern, the voice resource controller 132 checks in step 220 if a prescribed timeout value has been exceeded; if a prescribed timeout value has been exceeded, the voice resource controller 132 causes the browser 130 to request a timeout operation using a specified timeout URL in step 222.

The voice resource control 132, also referred to as a media resource, also manages recording operations, for example recording of messages by a user to be supplied to the application server 66. For example, the voice resource controller 132 checks in step 224 whether there is a record operation, as specified in the XML element 306, that is pending. If no record is pending, then the browser 56 posts to the voice application URL upon collecting the input digits in step 214. Hence, the proxy browser 62 can provide the appearance to the user that pressing a "hot key" causes an immediate response in the proxy browser 62 to play another audio file, when actually the browser 130 merely posts the "hot key" input to the voice application URL, causing the server 64 to return another HTML/XML page including the sound to be played. Hence, the audio resource 132 does not need any intelligence in regards to digits pressed, other than to post the digits to the server.

If a record operation is pending, the voice resource control 132 begins recording in step 226, for example by playing a tone to signal the user to begin speaking. The voice resource control 132 continues to record a timeout occurs (e.g., 30 seconds), or the user enters a key indicating recording should be halted.

After recording the audio message spoken by the user, the proxy browser 62 posts the data to the web server 64 in a prescribed sequence. Specifically, providing a user with the experience of a voice mail type application requires that certain operations be performed in a prescribed sequence; if the user presses a "1" to replay what has been recorded, then the recorded audio file must be posted to the application server 66 before the user input "1" is supplied, otherwise the application server 66 would not be able to replay the recorded audio file. Hence, the voice resource control 132 "quietly" posts the recorded audio file to the "upload URL" specified in the record tag 306. The browser then posts the user input (e.g., as specified in the HTML form 308) to another URL specified within the HTML form 308.

Note that the above-described operations in FIG. 7 are based on the voice resource controller providing specific instructions to a corresponding one of the interface cards 138 or 144, depending on the capabilities of the user device as specified in the device capabilities table 160. Hence, if the voice resource controller 132 detects an HTML tag that specifies displaying a message, the voice resource control 132 will send that command to the corresponding network interface card 138 or 144 only if the capabilities information stored in the capabilities table 160 specifies that the user device is capable of displaying data; otherwise, the voice resource controller 132 disregards the HTML tag.

According to the disclosed embodiment, advanced audio control is provided to user devices that lack browser functionality by providing a proxy browser within the access network serving the user devices, enabling the user devices to interact with an application server via an HTTP connection. The proxy browser selectively implements HTML and XML instructions for voice messaging applications, based on the determined capabilities of the user device. Hence, any user device can enjoy web based audio control for voice applications and/or data applications, by using a proxy browser that selectively provides to the user device the functionality supported by the user device.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a proxy browser configured for executing a web browser according to hypertext transport (HTTP) protocol, the method comprising:
   receiving a hypertext markup language (HTML) page by the web browser, from an HTTP connection, having an HTML tag and at least one extensible markup language (XML) element specifying a directive for controlling an audio operation to be performed by an executable media resource;
   determining capabilities of a user device configured for receiving prescribed media information from the proxy browser; and
   selectively executing by the executable media resource at least one of the HTML tag and the audio operation for delivery of the prescribed media information to the user device, based on the determined capabilities of the user device.

2. The method of claim 1, wherein the selectively executing step includes playing an audio file for the user device based on the determined capabilities specifying that the user device includes an audio speaker.

3. The method of claim 2, wherein the selectively executing step includes supplying audio data generated during the playing of the audio file to a selected network interface card configured for communication with the user device according to a prescribed network protocol.

4. The method of claim 3, wherein the supplying step includes supplying the audio signals to one of a data network interface card configured for communication with the user device according to Internet Protocol and a telephony card configured for communication with the user device according to a public switched telephone network protocol.

5. The method of claim 3, wherein the playing step further includes interrupting the supplied audio data in response to a detected user key input, the method further including:
   posting the detected user key input via the HTTP connection to a Uniform Resource Locator (URL) specified in the HTML page;

receiving a second HTML page from the HTTP connection having a second XML element specifying a directive for controlling a second audio operation to be performed by the executable media resource; and executing the second audio operation for delivery to the user device.

6. The method of claim 2, wherein the selectively executing step includes supplying data from the HTML tag to the user device based on the determined capabilities specifying that the user device includes a display.

7. The method of claim 6, wherein the selectively executing step includes initiating a recording operation for audio signals received from the user device based on the determined capabilities specifying that the user device includes a microphone.

8. The method of claim 7, wherein the step of initiating a recording operation further includes recording a voice input and sending the recorded voice input according to HTTP protocol to a destination specified in the XML element.

9. The method of claim 8, further comprising posting a user input, that describes the recorded voice input, by the web browser to a second destination specified by the HTML page in a prescribed sequence relative to the sending of the recorded voice input.

10. The method of claim 1, wherein the step of selectively executing the audio operation includes recording, by the executable media resource, a voice input and sending the recorded voice input according to HTTP protocol to a destination specified in the XML element, based on the determined capabilities specifying that the user device includes a microphone.

11. The method of claim 10, further comprising posting a user input, that describes the recorded voice input, by the web browser to a second destination specified by the HTML page in a prescribed sequence relative to the sending of the recorded voice input.

12. The method of claim 1, wherein the selectively executing step includes executing the audio operation and ignoring the HTML tag based on the determined capabilities specifying that the user device includes an audio speaker and a determined absence of a display in the user device.

13. A method in a proxy browser configured for executing a web browser according to a hypertext transport protocol (HTTP), the method comprising:

detecting an incoming call from a user device configured for sending and receiving prescribed media information according to a prescribed device network protocol;

sending an HTML request by the web browser to a destination server via an HTTP connection in response to the incoming call;

receiving an HTML page by the web browser, from the HTTP connection, having an HTML tag and at least one extensible markup language (XML) element specifying a directive for controlling an audio operation to be performed by an executable media resource; and selectively executing by the executable media resource at least one of the HTML tag and the audio operation for delivery of the prescribed media information to the user device, based on the determined capabilities of the user device.

14. The method of claim 13, wherein the detecting step includes:

detecting an off hook condition of the user device by a network interface card configured for interacting with the user device according to the prescribed network protocol; and sending a signal by the network interface card to the executable media resource indicating the user device is requesting service; and sending a message to the web browser by the executable media resource to send the HTML request.

15. The method of claim 14, wherein the step of sending a message to the web browser includes sending digits received from the user device.

16. The method of claim 15, wherein the step of sending an HTML request includes sending the digits received from the user device as part of a Uniform Resource Locator (URL) specifying a location of the destination server via the HTTP connection.

17. The method of claim 13, wherein the selecting step includes playing an audio file for the user device based on the determined capabilities specifying that the user device includes an audio speaker.

18. The method of claim 17, wherein the selectively executing step includes supplying audio data generated during the playing of the audio file to a selected network interface card configured for communication with the user device according to the prescribed device network protocol.

19. The method of claim 18, wherein the supplying step includes supplying the audio signals to one of a data network interface card configured for communication with the user device according to Internet Protocol and a telephony card configured for communication with the user device according to a public switched telephone network protocol.

20. The method of claim 18, wherein the playing step further includes interrupting the supplied audio data in response to a detected user key input, the method further including:

posting the detected user key input via the HTTP connection to a Uniform Resource Locator (URL) specified in the HTML page;

receiving a second HTML page from the HTTP connection having a second XML element specifying a directive for controlling a second audio operation to be performed by the executable media resource; and executing the second audio operation for delivery to the user device.

21. The method of claim 17, wherein the selectively executing step includes supplying data from the HTML tag to the user device based on the determined capabilities specifying that the user device includes a display.

22. The method of claim 13, wherein the selectively executing step includes initiating a recording operation for audio signals received from the user device based on the determined capabilities specifying that the user device includes a microphone.

23. The method of claim 22, wherein the step of initiating a recording operation further includes recording a voice input and sending the recorded voice input according to HTTP protocol to a destination specified in the XML element.

24. The method of claim 23, further comprising posting a user input, that describes the recorded voice input, by the web browser to a second destination specified by the HTML page in a prescribed sequence relative to the sending of the recorded voice input.

25. The method of claim 13, wherein the step of selectively executing the audio operation includes recording, by the executable media resource, a voice input and sending the recorded voice input according to HTTP protocol to a destination specified in the XML element, based on the determined capabilities specifying that the user device includes a microphone.

26. The method of claim 25, further comprising posting a user input, that describes the recorded voice input, by the web browser to a second destination specified by the HTML page in a prescribed sequence relative to the sending of the recorded voice input.

27. The method of claim 13, wherein the selectively executing step includes executing the audio operation and ignoring the HTML tag based on the determined capabilities specifying that the user device includes an audio speaker and a determined absence of a display in the user device.

28. A computer readable medium having stored thereon sequences of instructions for executing a web browser by a proxy browser according to hypertext transport (HTTP) protocol, the sequences of instructions including instructions for performing the steps of:

receiving a hypertext markup language (HTML) page by the web browser, from an HTTP connection, having an HTML tag and at least one extensible markup language (XML) element specifying a directive for controlling an audio operation to be performed by an executable media resource;

determining capabilities of a user device configured for receiving prescribed media information from the proxy browser; and selectively executing by the executable media resource at least one of the HTML tag and the audio operation for delivery of the prescribed media information to the user device, based on the determined capabilities of the user device.

29. The medium of claim 28, wherein the selectively executing step includes playing an audio file for the user device based on the determined capabilities specifying that the user device includes an audio speaker.

30. The medium of claim 29, wherein the selectively executing step includes supplying audio data generated during the playing of the audio file to a selected network interface card configured for communication with the user device according to a prescribed network protocol.

31. The medium of claim 30, wherein the supplying step includes supplying the audio signals to one of a data network interface card configured for communication with the user device according to Internet Protocol and a telephony card configured for communication with the user device according to a public switched telephone network protocol.

32. The medium of claim 30, wherein the playing step further includes interrupting the supplied audio data in response to a detected user key input, the medium further including instructions for performing the steps of:

posting the detected user key input via the HTTP connection to a Uniform Resource Locator (URL) specified in the HTML page;

receiving a second HTML page from the HTTP connection having a second XML element specifying a directive for controlling a second audio operation to be performed by the executable media resource; and executing the second audio operation for delivery to the user device.

33. The medium of claim 29, wherein the selectively executing step includes supplying data from the HTML tag to the user device based on the determined capabilities specifying that the user device includes a display.

34. The medium of claim 28, wherein the selectively executing step includes initiating a recording operation for audio signals received from the user device based on the determined capabilities specifying that the user device includes a microphone.

35. The medium of claim 34, wherein the step of initiating a recording operation further includes recording a voice input and sending the recorded voice input according to HTTP protocol to a destination specified in the XML element.

36. The medium of claim 35, further comprising instructions for performing the step of posting a user input, that describes the recorded voice input, by the web browser to a second destination specified by the HTML page in a prescribed sequence relative to the sending of the recorded voice input.

37. The medium of claim 28, wherein the step of selectively executing the audio operation includes recording, by the executable media resource, a voice input and sending the recorded voice input according to HTTP protocol to a destination specified in the XML element, based on the determined capabilities specifying that the user device includes a microphone.

38. The medium of claim 37, further comprising instructions for performing the step of posting a user input, that describes the recorded voice input, by the web browser to a second destination specified by the HTML page in a prescribed sequence relative to the sending of the recorded voice input.

39. The medium of claim 28, wherein the selectively executing step includes executing the audio operation and ignoring the HTML tag based on the determined capabilities specifying that the user device includes an audio speaker and a determined absence of a display in the user device.

40. A computer readable medium having stored thereon sequences of instructions for executing in a proxy browser a web browser according to a hypertext transport protocol (HTTP), the sequences of instructions including instructions for performing the steps of:

detecting an incoming call from a user device configured for sending and receiving prescribed media information according to a prescribed device network protocol;

sending an HTML request by the web browser to a destination server via an HTTP connection in response to the incoming call;

receiving an HTML page by the web browser, from the HTTP connection, having an HTML tag and at least one extensible markup language (XML) element specifying a directive for controlling an audio operation to be performed by an executable media resource; and selectively executing by the executable media resource at least one of the HTML tag and the audio operation for delivery of the prescribed media information to the user device, based on the determined capabilities of the user device.

41. The medium of claim 40, wherein the detecting step includes:

detecting an off hook condition of the user device by a network interface card configured for interacting with the user device according to the prescribed network protocol; and sending a signal by the network interface card to the executable media resource indicating the user device is requesting service; and sending a message to the web browser by the executable media resource to send the HTML request.

42. The medium of claim 41, wherein the step of sending a message to the web browser includes sending digits received from the user device.

43. The medium of claim 42, wherein the step of sending an HTML request includes sending the digits received from the user device as part of a Uniform Resource Locator (URL) specifying a location of the destination server via the HTTP connection.

44. The medium of claim 40, wherein the selecting step includes playing an audio file for the user device based on the determined capabilities specifying that the user device includes an audio speaker.

45. The medium of claim 44, wherein the selectively executing step includes supplying audio data generated during the playing of the audio file to a selected network interface card configured for communication with the user device according to the prescribed device network protocol.

46. The medium of claim 45, wherein the supplying step includes supplying the audio signals to one of a data network interface card configured for communication with the user device according to Internet Protocol and a telephony card configured for communication with the user device according to a public switched telephone network protocol.

47. The medium of claim 45, wherein the playing step further includes interrupting the supplied audio data in response to a detected user key input, the medium further including instructions for performing the steps of:

posting the detected user key input via the HTTP connection to a Uniform Resource Locator (URL) specified in the HTML page;

receiving a second HTML page from the HTTP connection having a second XML element specifying a directive for controlling a second audio operation to be performed by the executable media resource; and executing the second audio operation for delivery to the user device.

48. The medium of claim 44, wherein the selectively executing step includes supplying data from the HTML tag to the user device based on the determined capabilities specifying that the user device includes a display.

49. The medium of claim 40, wherein the selectively executing step includes initiating a recording operation for audio signals received from the user device based on the determined capabilities specifying that the user device includes a microphone.

50. The medium of claim 49, wherein the step of initiating a recording operation further includes recording a voice input and sending the recorded voice input according to HTTP protocol to a destination specified in the XML element.

51. The medium of claim 50, further comprising posting a user input, that describes the recorded voice input, by the web browser to a second destination specified by the HTML page in a prescribed sequence relative to the sending of the recorded voice input.

52. The medium of claim 40, wherein the step of selectively executing the audio operation includes recording, by the executable media resource, a voice input and sending the recorded voice input according to HTTP protocol to a destination specified in the XML element, based on the determined capabilities specifying that the user device includes a microphone.

53. The medium of claim 52, further comprising posting a user input, that describes the recorded voice input, by the web browser to a second destination specified by the HTML page in a prescribed sequence relative to the sending of the recorded voice input.

54. The medium of claim 40, wherein the selectively executing step includes executing the audio operation and ignoring the HTML tag based on the determined capabilities specifying that the user device includes an audio speaker and a determined absence of a display in the user device.

55. A processor-based device configured for executing audio operations based on a hypertext markup language (HTML) page received from a server according to hypertext transport protocol (HTTP), the device comprising:

a web browser configured for selectively interpreting the HTML page, the HTML page including at least one of an HTML tag and an XML element that specifies a directive for controlling an audio operation to be performed for a user device; and a media resource configured for selectively executing at least one of the audio operation and the HTML tag based on determined capabilities of the user device.

56. The device of claim 55, further comprising an XML parser for extracting the XML element and supplying the extracted XML element to the media resource.

57. The device of claim 55, wherein the media resource includes a device capabilities table specifying the capabilities of at least the user device.

58. The device of claim 57, further comprising a device interface configured for communicating with the user device according to a selected one of a plurality of network access protocols based on the corresponding capabilities of the user device.

59. The device of claim 58, wherein the device interface includes:

a voice over Internet Protocol (IP) network interface card for communication with the user device according to Internet Protocol; and a telephony card configured for communication with the user device according to a public switched telephone network protocol, the media resource selecting one of the voice over IP network interface card and the telephony card for communication with the user device based on the corresponding capabilities of the user device.

60. The method of claim 1, wherein the HTML page includes a plurality of XML elements that specify directives for controlling respective audio operations, the selectively executing including executing the audio operations based on fetching a plurality of audio files and playing the plurality of audio files in a prescribed sequence based on the respective XML elements.

61. The method of claim 13, wherein the HTML page includes a plurality of XML elements that specify directives for controlling respective audio operations, the selectively executing including executing the audio operations based on fetching a plurality of audio files and playing the plurality of audio files in a prescribed sequence based on the respective XML elements.

62. The medium of claim 28, wherein the HTML page includes a plurality of XML elements that specify directives for controlling respective audio operations, the selectively executing including executing the audio operations based on fetching a plurality of audio files and playing the plurality of audio files in a prescribed sequence based on the respective XML elements.

63. The medium of claim 40, wherein the HTML page includes a plurality of XML elements that specify directives for controlling respective audio operations, the selectively executing including executing the audio operations based on fetching a plurality of audio files and playing the plurality of audio files in a prescribed sequence based on the respective XML elements.

64. The device of claim 55, wherein the HTML page includes a plurality of XML elements that specify directives for controlling respective audio operations, the media resource configured for executing the audio operations based on fetching a plurality of audio files and playing the plurality of audio files in a prescribed sequence based on the respective XML elements.

* * * * *